(12) United States Patent
Treble et al.

(10) Patent No.: US 11,205,153 B1
(45) Date of Patent: Dec. 21, 2021

(54) SYSTEM AND METHOD FOR DETERMINING TIME OF DELIVERY OF ORDER

(71) Applicant: GrubHub Holdings Inc., Chicago, IL (US)

(72) Inventors: Jonathan Peter Treble, Chicago, IL (US); Lee Frederick Baker, Chicago, IL (US); Matthew Maloney, Chicago, IL (US)

(73) Assignee: GRUBHUB HOLDINGS, INC., Chicago, IL (US)

( * ) Notice: Subject to any disclaimer, the term of this patent is extended or adjusted under 35 U.S.C. 154(b) by 140 days.

(21) Appl. No.: 16/694,864

(22) Filed: Nov. 25, 2019

Related U.S. Application Data

(63) Continuation of application No. 14/080,994, filed on Nov. 15, 2013, now abandoned.

(51) Int. Cl.
*G06Q 10/08* (2012.01)
*G06Q 50/12* (2012.01)

(52) U.S. Cl.
CPC .......... *G06Q 10/083* (2013.01); *G06Q 50/12* (2013.01)

(58) Field of Classification Search
CPC ..... G06Q 30/016; G06Q 10/083; H04M 3/42; H04M 7/00; H04M 7/0024
See application file for complete search history.

(56) References Cited

U.S. PATENT DOCUMENTS

| | | | |
|---|---|---|---|
| 4,757,267 A | 7/1988 | Riskin | |
| 4,797,818 A | 1/1989 | Cotter | |
| 5,136,636 A | 8/1992 | Wegrzynowicz | |
| 5,991,739 A | 11/1999 | Cupps | |
| 6,384,850 B1 | 5/2002 | McNally et al. | |
| 6,608,892 B2 | 8/2003 | Shaffer | |
| 6,871,325 B1 | 3/2005 | McNally et al. | |
| 6,976,004 B2 | 12/2005 | Wittrup | |
| 6,982,733 B1 | 1/2006 | McNally et al. | |
| 7,222,081 B1 | 5/2007 | Sone | |
| 7,287,002 B1 | 10/2007 | Asher | |

(Continued)

FOREIGN PATENT DOCUMENTS

| | | |
|---|---|---|
| JP | 9-296819 | 11/1997 |
| JP | 9-325988 | 12/1997 |

(Continued)

OTHER PUBLICATIONS

Krishna Bharat, "Migratory Applications".

(Continued)

*Primary Examiner* — Florian M Zeender
*Assistant Examiner* — Milena Racic
(74) *Attorney, Agent, or Firm* — Baker Botts L.L.P.

(57) ABSTRACT

A method and system for determining the time of delivery of an order is performed by a service system. The system receives the order from a customer device, and maps the customer telephone number to a routing telephone number. The system then sends the order with the routing telephone number to a provider, such as a restaurant. The provider prepares the order. A deliveryman calls the routing telephone number when he delivers the order to the customer. The system sets the reception time of the call as the time of delivery of the order. The system then forwards the call to the customer.

20 Claims, 12 Drawing Sheets

(56) References Cited

U.S. PATENT DOCUMENTS

| | | | |
|---|---|---|---|
| 7,295,920 B2 | 11/2007 | Finkelstein | |
| 8,015,023 B1 | 9/2011 | Lee | |
| 8,146,077 B2 | 3/2012 | McNally et al. | |
| 8,385,232 B1 | 2/2013 | Chen | |
| 8,447,067 B2* | 5/2013 | Rhoads | G06Q 10/083 382/100 |
| 9,531,878 B2* | 12/2016 | Mezhibovsky | H04W 4/16 |
| 9,532,209 B2* | 12/2016 | Aleksin | H04W 8/183 |
| 2003/0125963 A1 | 7/2003 | Haken | |
| 2003/0147519 A1 | 8/2003 | Jain | |
| 2005/0004843 A1 | 1/2005 | Heflin | |
| 2005/0031114 A1 | 2/2005 | Boeckman | |
| 2005/0047575 A1 | 3/2005 | Parker | |
| 2006/0010037 A1 | 1/2006 | Angert et al. | |
| 2006/0020497 A1 | 1/2006 | Mcnally | |
| 2006/0069578 A1 | 3/2006 | Borkowski et al. | |
| 2006/0069620 A1 | 3/2006 | Sutcliffe | |
| 2006/0206390 A1 | 9/2006 | Asano | |
| 2007/0106568 A1 | 5/2007 | Asher | |
| 2007/0238472 A1 | 10/2007 | Wanless | |
| 2008/0319864 A1 | 12/2008 | Leet | |
| 2009/0099972 A1 | 4/2009 | Angert et al. | |
| 2009/0319166 A1 | 12/2009 | Khosravy et al. | |
| 2010/0250384 A1 | 9/2010 | Bhargava | |
| 2011/0161137 A1 | 6/2011 | Ubalde et al. | |
| 2011/0218839 A1 | 9/2011 | Shamaiengar | |
| 2012/0195422 A1 | 8/2012 | Famous | |
| 2012/0290414 A1* | 11/2012 | Harman | G06Q 50/12 705/15 |
| 2013/0144730 A1 | 6/2013 | Harman | |
| 2014/0214465 A1* | 7/2014 | L'Heureux | G06Q 30/0603 705/7.13 |
| 2014/0257877 A1* | 9/2014 | L'Heureux | G06Q 50/12 705/5 |
| 2015/0262121 A1* | 9/2015 | Riel-Dalpe | G06Q 50/12 705/15 |

FOREIGN PATENT DOCUMENTS

| | | |
|---|---|---|
| WO | WO 97/08635 A1 | 3/1997 |
| WO | WO 98/35311 A1 | 8/1998 |
| WO | WO 99/17236 A1 | 4/1999 |
| WO | WO/200107617 | 9/2001 |

OTHER PUBLICATIONS

About Us, "Compuwave Technologies Inc.", dated Feb. 7, 2001.

Andrew Fano, "Shopper's Eye: Using Lcoation-based filtering for a shopping agent in the physical world", dated 1998.

Arthur Keller, "The DIANA approach to mobile computing", CiteSeer, dated 1995.

Barron Housel, "WebExpress: a system for optimizing web browsing in a wireless environment".

Carrie Lehman, "Service connects restaurants, customers via orders by Internet", Alaska Journal of Commerce, dated Apr. 28, 1997.

IBM, "POS Computer", dated1998.

A Chavez, "A real-life experiment in creating an agent marketplace", PAAM, dated 1997.

John Soeder, "Cyber Solicitation, Restaurant Hospitality", Dated Sep. 1997.

Wireless Products, "Compuwave Technologies Inc.", dated Feb. 7, 2001.

Len Lewis, "Opening the gates, Progressive Grover", dated Jul. 1998.

Micros Systems, Inc., "New Products, Micros Systems", dated Nov. 11, 1996.

Micros Systems, Inc., "POS Configurator User's Guide", 3700 POS, Micros Systems, Inc., dated 1998.

Richard De Santa, "Are you into your customers?", Supermarket Business, dated Jan. 1997.

Rita Marie Emmer, "Marketing Hotels: Using Global Distribution System", Cornell Hotel and Restaurant Administration Quarterly dated 1993, 34; 80.

T. Imielinski, "Adaptive Wireless Information Systems", dated 1994.

Jennifer Rowley, "Internet food retailing: the UK in context", ProQuest LLC, dated 1998.

U.S. Appl. No. 14/080,994, filed Nov. 15, 2013, Office Action, dated Dec. 1, 2016.

U.S. Appl. No. 14/080,994, filed Nov. 15, 2013, Final Office Action, dated Nov. 19, 2015.

Treble, U.S. Appl. No. 14/080,994, filed Nov. 15, 2013, Office Action, dated May 11, 2015.

Treble, U.S. Appl. No. 14/080,994, filed Nov. 15, 2013, Final Office Action, dated Jun. 16, 2017.

* cited by examiner

| | |
|---|---|
| Order ID | |
| Diner name | |
| Diner address | |
| Diner telephone number | |
| Diner email address | |
| Order instruction | |
| Order item ID | |
| Order item quantity | |
| Order item instruction | |
| Order item unit price | |
| . . . . | |
| Order total price | |
| Order status | |
| Order reception timestamp | |
| Order confirmation timestamp | |
| Order delivery-by timestamp | |
| Order out-for-delivery timestamp | |
| Order delivered timestamp | |
| Restaurant ID | |
| Order routing phone number | |
| . . . . | |

SYSTEM AND METHOD FOR DETERMINING TIME OF DELIVERY OF ORDER

CROSS REFERENCE TO RELATED APPLICATIONS

This application is related to U.S. patent application Ser. No. 13/612,243, entitled "METHOD AND APPARATUS FOR MANAGING ORDERS FOR A REAL TIME INTEGRATED RESTAURANT SERVICE," filed Sep. 12, 2012, assigned to GrubHub, Inc. of Chicago, Ill., which is hereby incorporated by reference, and which is a continuation-in-part of U.S. patent application Ser. No. 13/337,362, entitled "REAL TIME INTEGRATED SHOPPING SERVICE," filed Dec. 27, 2011, assigned to GrubHub, Inc. of Chicago, Ill., which is hereby incorporated by reference. This application is further related to U.S. patent application Ser. No. 13/622,659, entitled "SYSTEM, METHOD AND APPARATUS FOR MANAGING THE DELIVERY OF MADE-TO-ORDER FOOD," filed Sep. 19, 2012, assigned to GrubHub, Inc. of Chicago, Ill., which is hereby incorporated by reference. Furthermore, this application is related to U.S. patent application Ser. No. 13/622,837, entitled "SYSTEM, METHOD AND APPARATUS FOR RECEIVING BIDS FROM DINERS FOR EXPEDITED FOOD DELIVERY," filed Sep. 19, 2012, assigned to GrubHub, Inc. of Chicago, Ill., which is hereby incorporated by reference. Additionally, this application is related to U.S. patent application Ser. No. 13/622,868, entitled "SYSTEM, METHOD AND APPARATUS FOR MANAGING INCENTIVE BASED DELIVERY OF MADE-TO-ORDER FOOD UTILIZING A NETWORK OF INDEPENDENT DRIVERS," filed Sep. 19, 2012, assigned to GrubHub, Inc. of Chicago, Ill., which is hereby incorporated by reference.

FIELD OF THE DISCLOSURE

The present invention relates to a system and method for providing a delivery service, and more particularly relates to a system and method for providing a food delivery service. More particularly still, the present disclosure relates to a system and method for determining the time of delivery of a food order and the service time of the food order.

DESCRIPTION OF BACKGROUND

The quality of a delivery service is a critical component of customer satisfaction. Better quality of the delivery service boosts sales of the underlying goods. The quality of the delivery service often hinges on an accurate estimation or determination of the time of delivery of an order, such as a food delivery order fulfilled by a restaurant. Oftentimes, customers are frustrated with the lack of information on the accurate service time for their orders. The service time is the time starting from the moment the order is placed and ending when the ordered goods are delivered. The time that a deliveryman takes to transport the order from the serving restaurant to the diner is termed herein as the delivery time of the order. The delivery time is thus a part of the service time. The time of delivery of the order is the time when the order arrives at the delivery address for the order.

The lack of information on the accurate service time is more onerous where customers expect quick deliveries. For example, a diner usually expects his food order delivered shortly after the order is placed through a restaurant service system. The diner will likely become frustrated if his food is delivered, for example, two hours after he placed the order. Accordingly, diners like to know how long each restaurant takes to deliver delivery food orders when they select a restaurant to order food from. Additionally, accurate service time information allows customers to better plan their activities. For example, the diner may decide to run an errand after he places a food order if the accurate time is known and far enough in the future to allow the errand.

Accordingly, there is a need for a system and method that accurately determine the time of delivery and service time of an order, such as a food order. Furthermore, there is a need for a system and method for determining the delivery time and service time of providers, such as restaurants.

OBJECTS OF THE DISCLOSED SYSTEM, METHOD, AND APPARATUS

Accordingly, it is an object of this disclosure to provide a system and method for determining the time of delivery and service time of an order.

Another object of this disclosure is to provide a system and method for determining the time of delivery and service time of a food order fulfilled by a restaurant.

Another object of this disclosure is to provide a system and method for determining the service time of a provider.

Another object of this disclosure is to provide a system and method for determining the delivery time and service time of a restaurant.

Another object of this disclosure is to provide a system and method for determining the delivery time and service time of a provider based on the delivery times and service time of a group of orders.

Another object of this disclosure is to provide a system and method for determining the delivery time and service time of a restaurant based on the delivery times and service time of a group of food orders fulfilled by the restaurant.

Another object of this disclosure is to provide a system and method for determining the time of delivery of an order using customer telephone routing.

Another object of this disclosure is to provide a system and method for determining the time of delivery of a food order using diner telephone routing.

Another object of this disclosure is to provide a system and method for determining the time of delivery of an order using SMS message routing.

Another object of this disclosure is to provide a system and method for determining the time of delivery of a food order using SMS message routing.

Another object of this disclosure is to provide a system and method for safe guarding customer privacy.

Another object of this disclosure is to provide a system and method for reducing the number of canceled orders.

Another object of this disclosure is to provide a system and method for reducing the possibility of delivery miss.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a method and system for determining the time of delivery of an order. In accordance with the present teachings, the method operating within a service system includes receiving an order from a first customer device over a wide area network, and selecting a routing telephone number from a list of routing telephone numbers. The method furthering includes forming an association between the routing telephone number and the order. The method also includes sending the order with the selected routing telephone number to an on-site service appliance, and receiving a first order delivery message from a delivery mobile device. The first order delivery message indicates a first source telephone number, a first destination telephone number, a first message reception time, and a first message type. The first source telephone number corresponds to the delivery mobile device and the first destination telephone number is the selected routing telephone number. Additionally, the method includes mapping the first destination telephone number to a telephone number of a customer of the order, and sending a second order delivery message to a second customer device of the customer. The second order delivery message indicates a second source telephone number, a second destination telephone number and a second message type. The second destination telephone number is the telephone number of the customer. Moreover, the method includes setting the first message reception time as the time of delivery of the order.

Further in accordance with the present teachings is a service system for determining the time of delivery of an order. The system includes a first server that includes a first processor, a first network interface coupled to the first processor and adaptively coupled to a database, and a first server software application operating on the first processor. The system also includes a second server that includes a second processor, a second network interface coupled to the second processor, and a second server software application operating on the second processor. Additionally, the system includes a customer device, and a delivery mobile device that includes a third processor, a third network interface coupled to the third processor.

The first server software application is adapted to retrieve an order from the database, and select a routing telephone number from a list of routing telephone numbers. The first server software application is also adapted to form an association between the routing telephone number and the order. The first server software application is further adapted to send the order with the selected routing telephone number to an on-site service appliance.

The second server software application is adapted to receive a first order delivery message from the delivery mobile device. The first order delivery message indicates a first source telephone number, a first destination telephone number, a first message reception time, and a first message type. The first source telephone number corresponds to the delivery mobile device and the first destination telephone number is the selected routing telephone number. The second server software application is also adapted to map the first destination telephone number to a telephone number of the order. The telephone number corresponds to the customer device. The second server software application is further adapted to send a second order delivery message to the customer device. The second order delivery message indicates a second source telephone number, a second destination telephone number and a second message type. The second destination telephone number is the telephone number of the order. Additionally, the second server software application is adapted to set the first message reception time as the time of delivery of the order.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 10 is a table illustrating a sample order in accordance with the teachings of this disclosure.

DETAILED DESCRIPTION

Figure 1:
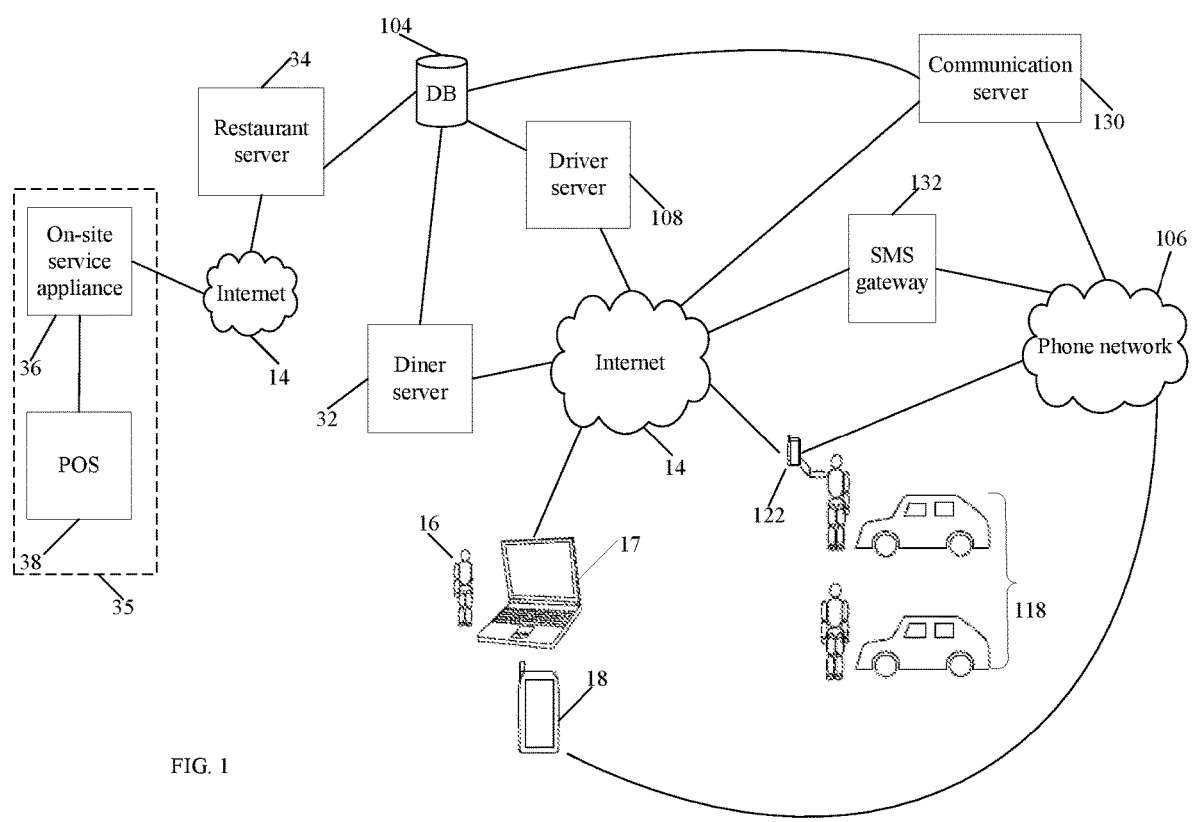
FIG. 1 is simplified block diagram of a restaurant service system constructed in accordance with this disclosure.

Turning to the Figures and to FIG. 1 in particular, a service system 100 for enabling and providing a service is illustrated. In one embodiment, the service system 100 is a restaurant service system that provides a restaurant service. The illustrative system 100 provides for real-time or near real-time information exchange between a restaurant 35, a diner 16, deliverymen 118, as well as integration with the restaurant's point-of-sale system 38 ("POS"). Integration with the POS will not only enable orders to be posted directly to the POS by the restaurant service, but also will allow the restaurant service to reflect menu changes in real time. As further explained herein, much of this integration is provided through the use of an on-site service appliance 36. The on-site service appliance 36 may be, for example, one of the devices as pictured in FIG. 11. In one implementation, the appliance 36 is a mobile device including a touchscreen, a processor, a display, a wireless network interface, some amount of memory, and a storage device. The on-site service appliance 36 can be coupled to the POS 38, so that the appliance 36 can post orders directly to the POS system 38, as well as monitor menu changes made in the POS system 38. In addition, the on-site service appliance 36 can be connected to a printer.

Figure 11:
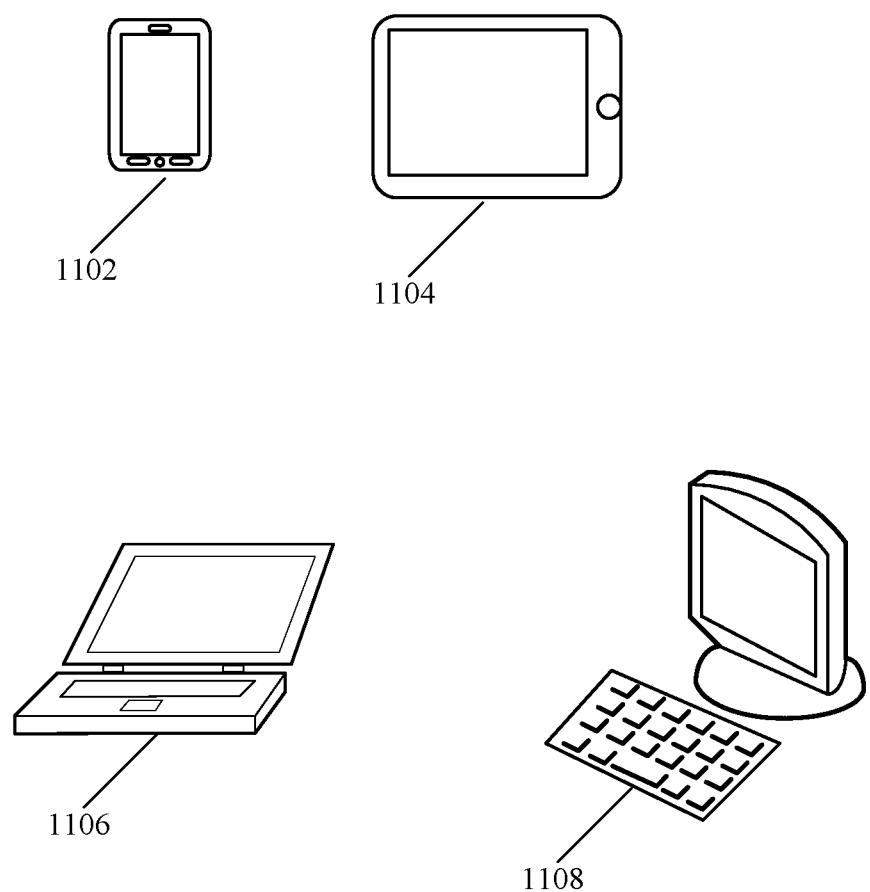
FIG. 11 is a perspective view of communication devices in accordance with the teachings of this disclosure.

The diner 16 accesses the restaurant service system 100 using communication devices 17 and 18, such as laptop computers, desktop computers, tablet computers or smartphones as pictured in FIG. 11. The diner devices 17,18 are more generally referred to herein as customer devices; and the diner 16 is more generally referred to herein as a customer. The diner devices 17,18 communicate with the system 100 over the world wide web, such as the Internet 14. For example, the diner devices 17,18 connect to the Internet 14 through a WiFi router (not shown). Alternatively, the diner devices 17,18 connect to the system 100 over a public telephone network 106. A diner server 32 within the system 100 interfaces with the diner devices 17,18. In response to inputs from the diner 16 using the diner device 17, the diner server 32 creates, modifies, or cancels orders in database 104. The orders are queued in a database 104, which also includes information regarding diners as well as restaurant menus, as more fully set forth in U.S. application Ser. No. 13/337,362, which was previously incorporated by reference.

A restaurant server 34 within the system 100, which is also coupled to the Internet 14 or another wide area network, interfaces with the on-site service appliance 36 (also interchangeably referred to herein as "on site source appliance"). The restaurant server 34 processes queued orders and communicates those orders to member restaurants 35 via the Internet 14, a public telephone network (such as the telephone network 106), or some other method. In a different implementation, the functions of the servers 32,34 are performed by a single server device. The member restaurant 35 and a delivery service may receive the orders using the on-site service appliance 36. The member restaurant 35 then prepares the food, which is delivered by a delivery driver 118 to the corresponding diner.

The system 100 also includes a driver server 108 that communicates with a driver mobile device 122 (such as a smartphone or a tablet computer), which runs a driver mobile software application, over the Internet 110. The driver mobile device 122 is also referred to herein a delivery mobile device. The driver mobile device 122 allows the driver 122 to place a phone call. In one implementation, the driver mobile device 122 is a conventional cellphone with a keypad.

Alternatively, the driver mobile device 122 includes a housing that comprises a touchscreen, a display, a processor, a wireless network interface, and a memory. The driver mobile device 122 connects to the Internet 14 through a WiFi router (not shown), or over the public telephone network 106 to communicate with the driver server 108. In a different implementation, the driver server 108 communicates with the driver mobile device 122 through a communication server 130. The communication server 130 communicates with the driver mobile device 122 over the Internet 14 or the telephone network 106. Similarly, the diner server 32 may communicate with the diner devices 18 through the communication server 130, which communicates with the diner devices 18 over the Internet 14 or the telephone network 106. The deliveryman (or delivery driver) 118 uses the driver mobile device 122 to retrieve orders from the driver server 108 for delivery.

In further implementation, the system 100 also includes a Short Message System ("SMS") gateway 132. The gateway 132 receives SMS messages from mobile devices (such as the diner devices 18 and the driver mobile devices 122), and forwards the SMS messages to a server, such as the communication server 130, within the system 100. Additionally, the gateway 132 receives SMS messages from the communication server 130, and forwards the received SMS messages to the target mobile devices, such as the diner devices 18 or the driver mobile devices 122.

It should be noted that, in one embodiment in accordance with the present teachings, the diner server 32, restaurant server 34, driver server 108 and communication server 130 each include a processor, a network interface, and some amount of memory. Additionally, in one implementation, the diner server 32, restaurant server 34, driver server 108 and communication server 130 communicate with each other over a private network. Furthermore, the diner server 32, restaurant server 34, driver server 108 and communication server 130 each includes a server software application to implement the functions and features of the restaurant services. In a different implementation, the functions of the servers 32,34,108,130 are performed on a same physical server device. In a further different implementation, the functions of the servers 32,34,108,130 are performed on multiple physical server devices at the same location or distributed across different geographical locations. The system 100 may further implement load balancing and redundancy mechanisms. Similarly, the database 104 can be a distributed database system, such as a database farm. In one implementation, the database 104 is a relational database, such as Oracle or Microsoft SQL databases. Alternatively, the database 104 is a cloud based database, such as Google BigTable.

Figure 2:
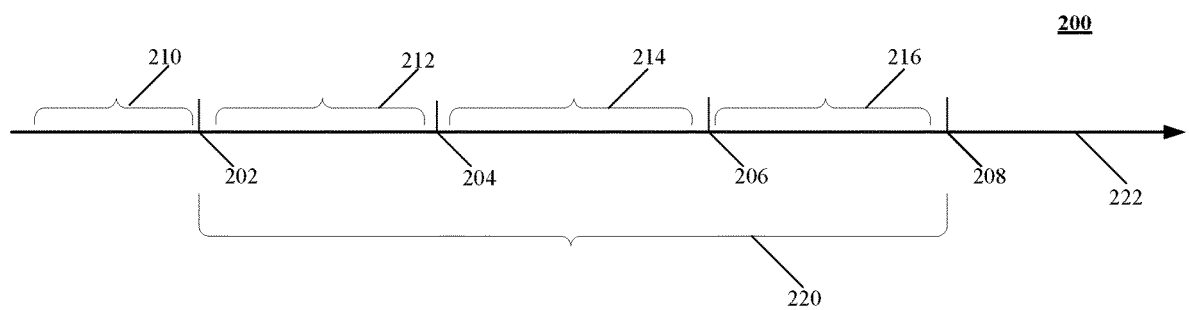
FIG. 2 is a time line diagram in accordance with the teachings of this disclosure.

The service time of an order is measured from the time when the order is placed to the time when the order is delivered to the customer (i.e., a diner for a food order). The service time is further illustrated by the reference to FIG. 2. Turning to FIG. 2, a time line 222 is shown with time marks 202,204,206,208. At time 202, an order is placed using the system 100. Before the order is placed, the diner 16 accesses the diner server 32 using the device 17 to build his order. To build the order, the diner 16 selects a restaurant and items from the menu of the selected restaurant. The order building time period is indicated at 210. After the order is placed, the diner server software application running on the diner server 32 stores the order into the database 104. A sample order structure is shown in FIG. 10. The time when the order is received by the diner server software application is indicated at 1046.

The restaurant server software application running on the restaurant server 34 then retrieves the order from the database 104, and sends the order to the appliance 36. At the time mark 204, the order is successfully transmitted. Thereafter, the appliance 36 and the restaurant 35 receive the order, which is displayed or indicated on the display screen of the appliance 36. The order transmission and reception time period is indicated at 212. The restaurant's food preparation time to fulfill the order is indicated at 214. The time period 214 starts from the time mark 204, when the restaurant 35 receives the order, to the time mark 206, when the order is prepared and picked up for delivery from the restaurant 35. It should be noted that the time period 214 may include a time period during which the order is prepared and waiting for being picked up by the deliveryman 118 for delivery.

The time that the deliveryman 118 takes to deliver the order to the diner 16 is indicated at 216. The delivery time 216 starts from the time mark 206 and ends at the time mark 208 when the order is transported to the delivery address of the order, such as the home or office address of the diner 16. The service time of the order is indicated at 220. The service time 220 is the sum of the order transmission time period 212, the order preparation time period 214 and the order delivery time 216.

The system 100 can accurately determine the time period 212 because the diner server 32 tracks when the order is placed at the time mark 202, and the restaurant server 34 tracks the time mark 204 when it successfully transmits the order to the application 36. For example, the restaurant server software application receives a reception confirmation message from the appliance 36 when the order is successfully received by the appliance 36.

Oftentimes, when an order is picked up by a delivery driver for delivery, the serving restaurant of the order notifies the restaurant server 34 that the order is out for delivery. For example, when the order is picked by the delivery driver 118 from the restaurant 35 for delivery, a clerk at the restaurant 35 uses the appliance 36 to notify the restaurant server software application that the order is out of delivery. The notification time is or substantially same as the time mark 206. For instance, the clerk clicks an Out-for-Delivery button associated with the order and presented by an appliance software application running on appliance 36. In response, the appliance software sends a notification (such as a message or a web service call) to the restaurant server software application.

However, deliverymen rarely notify a conventional restaurant service system when they arrive at the diners' residence or other delivery locations (such as an office), or handle over the ordered food to the diners. Accordingly, the conventional restaurant service system fails to obtain information as to when an order is actually delivered to the customers. Furthermore, the conventional restaurant service system cannot determine the service time of orders for a specific restaurant. However, when deliverymen arrive at delivery locations, they often call the diners to notify them that their orders are at their door step or ground level of their buildings.

Figure 3:
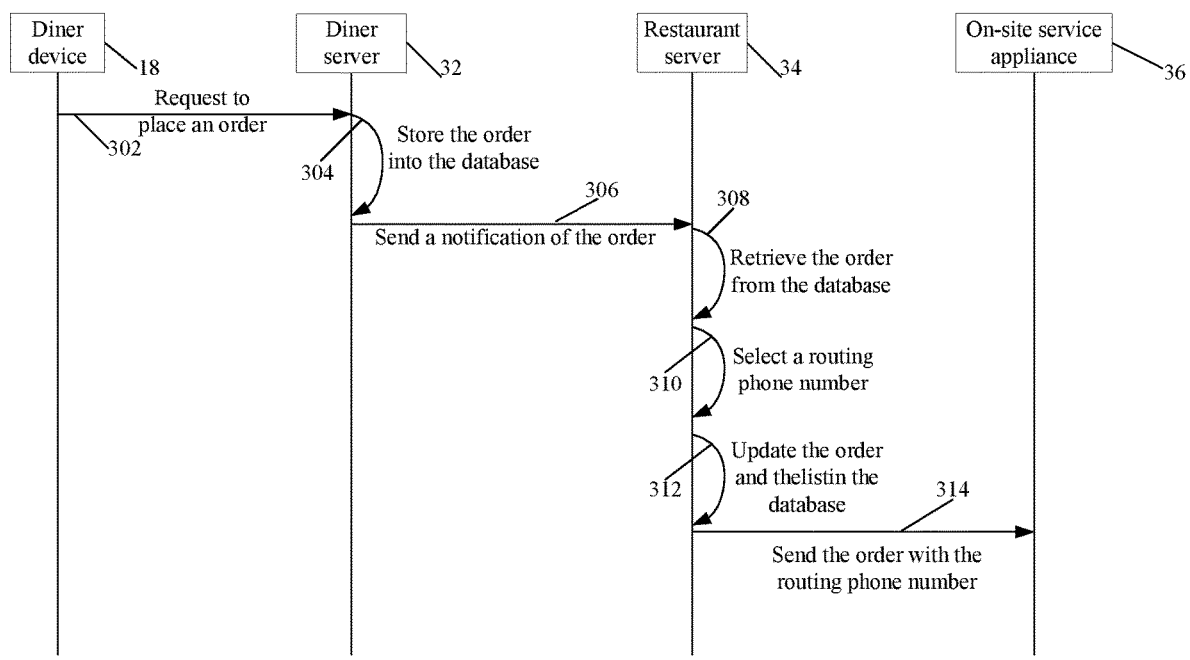
FIG. 3 is a sequence diagram depicting a process by which an order is placed and sent to a restaurant with a routing telephone number in accordance with the teachings of this disclosure.

To accurately determine the time of delivery of an order, the system 100 performs diner telephone routing such that the delivery driver 118 calls a telephone number of the restaurant service, rather than that of the diner 18, when the delivery driver 118 arrives at the diner's 18 delivery address. The diner telephone number routing process is further illustrated by reference to FIG. 3 and indicated at 300. Referring now to FIG. 3, at 302, the software application running on the diner device 18 sends a request to place an order to the diner server software application. The diner device software application can be a web browser (such as Google Chrome or Microsoft IE), a proprietary mobile software application, etc. The diner 18 first uses the diner device software application to browse and search for a desired restaurant and its menu items, and then selects desired items to build his order. Once the order is built, the diner 18 places the order by, for example, clicking an Order Now button provided by the diner device software application, which subsequently (at 302) sends the request to place the order to the diner server 32.

At 304, the diner server software application receives the request over a network interface of the diner server 32, and stores the order into the database 108. A table 1000 in FIG. 10 is a logical illustration of the order, which includes a plurality of fields, such as the diner telephone number 1008. At 306, the diner server software application sends a notification to the restaurant server 34 that the order has been placed, and is stored in the database 104. In one implementation, the notification is sent through a messaging server application. In response, at 308, the restaurant server software application retrieves the order from the database 104. In a different implementation, the diner server software application does not perform the step 306. Instead, the restaurant server software application (or a background process) periodically queries the database 104 for new orders. For example, every five seconds, the restaurant server software application queries the database 104 for orders that are placed in the last five seconds or order that have not been sent to the corresponding serving restaurants. In each of these cases, the order regarded as retrieved from the database 104.

Figure 4:
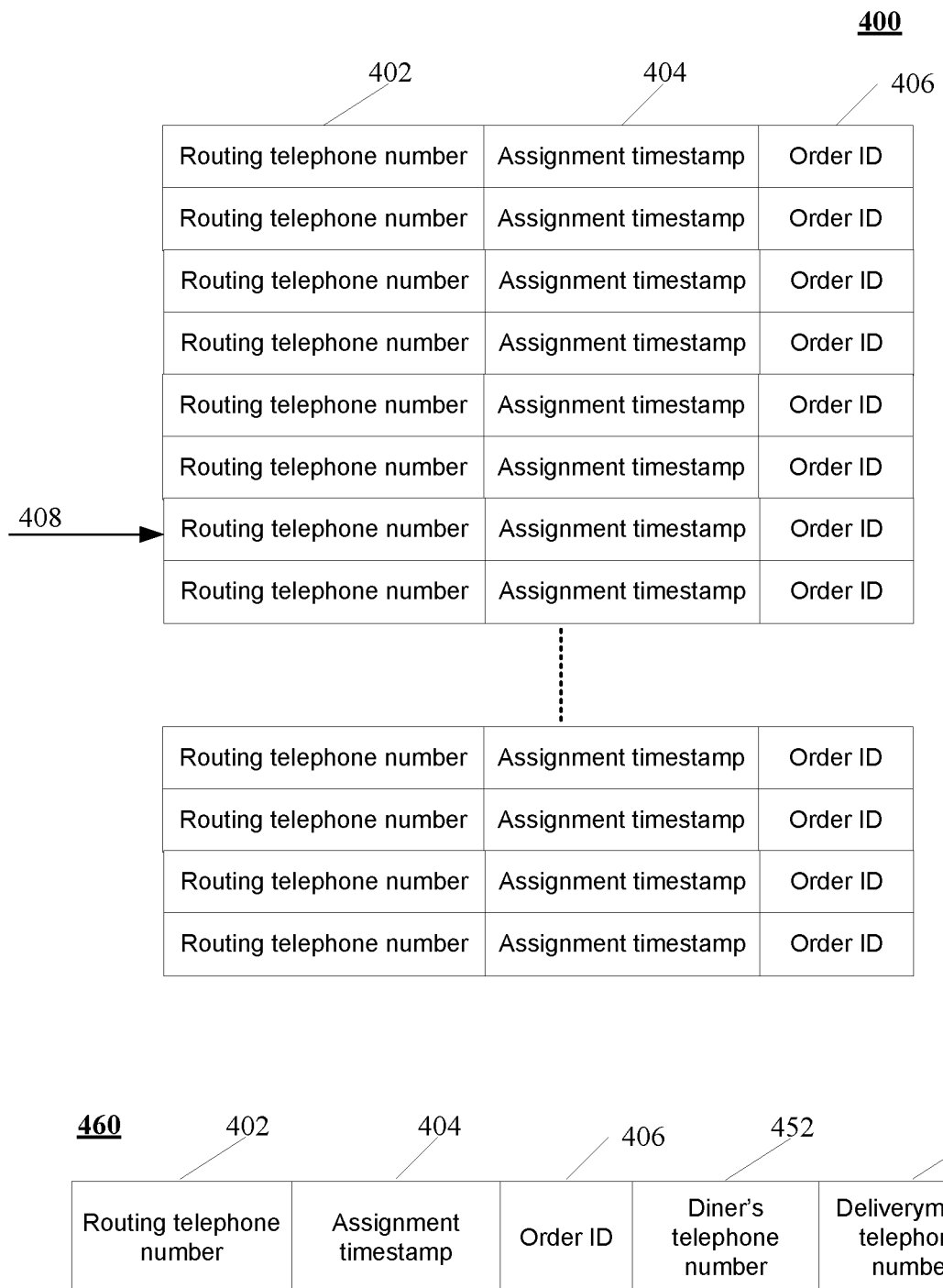
FIG. 4 is a table illustrating a list of routing telephone number entries in accordance with the teachings of this disclosure.

At 310, the restaurant server software application selects a routing telephone number for the order. The selected routing telephone number is the telephone number that the delivery driver 118 calls when he tries to contact the diner 16 notifying him that his order is at his doorstep or building. The restaurant service operates or maintains a list of routing telephone numbers as shown in FIG. 4. The list of routing telephone numbers is indicated at 400. In one implementation, each entry in the list comprises a routing telephone number 402, an assignment timestamp 404, and an order ID 406 indicating the order to which the routing telephone number 402 is assigned to. The assignment timestamp 404 indicates the date and time when the assignment is made. Accordingly, each entry in the list 400 represents an association and an assignment between the routing telephone number 402 and the order identified by the order ID 406. In one embodiment, the assignment is valid or live only for a fixed amount of time, such as thirty minutes. In other words, each association or assignment has a life or validity period. To ease the searching for the next available routing number, a pointer 408 is used to indicate the position in the list 400 from where searching the next available routing telephone number begins.

Figure 5:
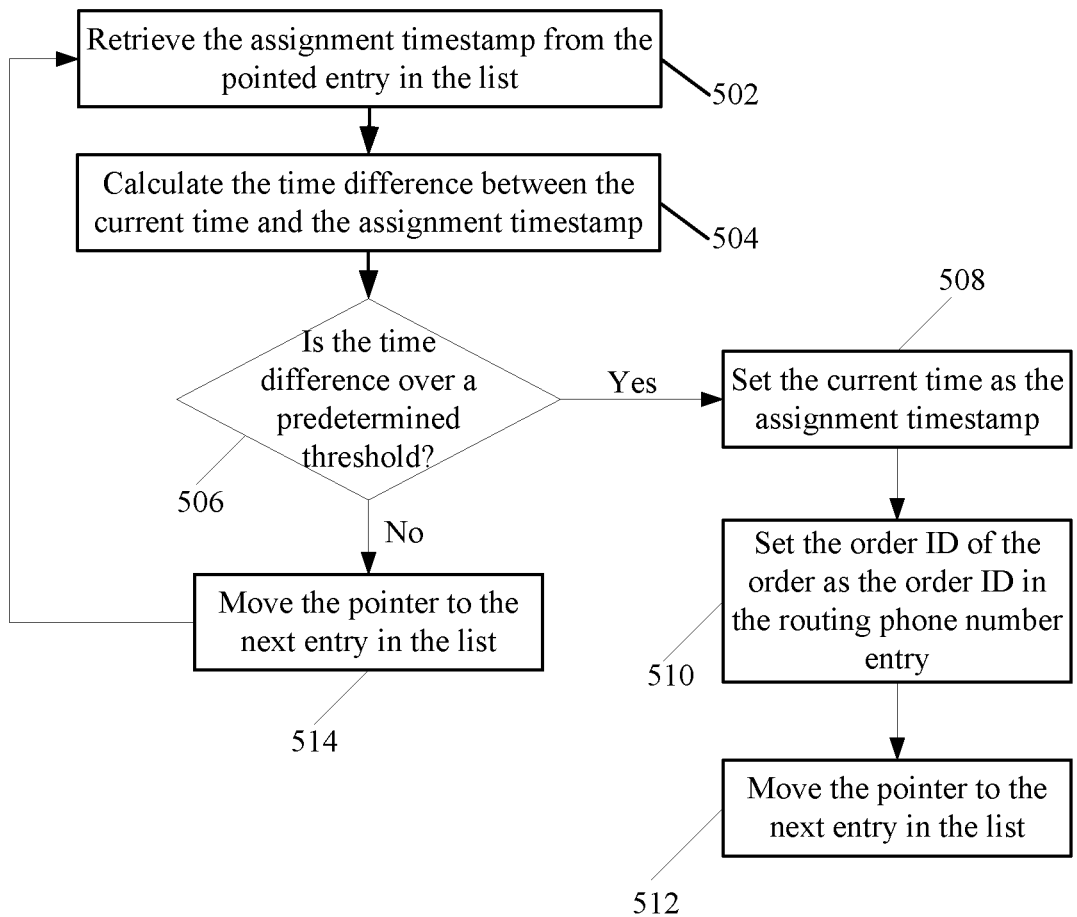
FIG. 5 is a flowchart that depicts a process by which a routing telephone number is selected in accordance with the teachings of this disclosure.

To select the next available routing telephone number for the order, the restaurant server software application performs a process 500 as illustrated in FIG. 5. Referring to FIG. 5, at 502, the restaurant server software application retrieves the assignment timestamp 404 from the routing telephone number entry pointed to by the pointer 408. At 504, the restaurant server software application calculates the time difference between the retrieved assignment timestamp 404 and the current time. At 506, the restaurant server software application determines whether the time difference is over a predetermined threshold (such as thirty minutes) before the current time. If so, at 508, the restaurant server software application associates the order with the available routing telephone number entry (which is pointed to by the pointer 408) by setting the assignment timestamp 404 to the current time. Moreover, at 510, the restaurant server software application sets the order ID of the order to the order ID field 406 of the routing telephone number entry at the pointer 408. At this point, the order is associated with the routing telephone number entry at the pointer 408. In a further implementation, at 510, the restaurant server software application writes the selected routing telephone number into the order as indicated at 1058 in FIG. 10. At 512, the restaurant server software application moves the pointer 408 to the next entry in the list 400.

Turning back to 506, if the time difference is same as or below the threshold, at 514, the restaurant server software application moves the pointer 408 to the next entry in the list 400. Additionally, the restaurant server software application searches for the next available entry in the list 400 by performing the elements 502,504,506 again. It should be noted that the restaurant server software application further incorporates a checking to avoid endless loop when there is not any available entry in the list 400.

Turning back to FIG. 3, at 312, the restaurant server software application stores the updated list 400 with the assignment and the updated order into the database 104. In a different implementation, the diner server software application performs the elements 310 and 312. At 314, the restaurant server software application sends the order to the appliance 36 with the routing telephone number indicated as the telephone number of the diner of the order. In one implementation, the diner telephone number 1008 of the order is replaced with the selected routing telephone number 1058 in the sent order. Accordingly, the order that the restaurant 35 receives through the appliance 36 contains the routing telephone number for this order, not the telephone number of the diner 18 of the order.

Figure 6:
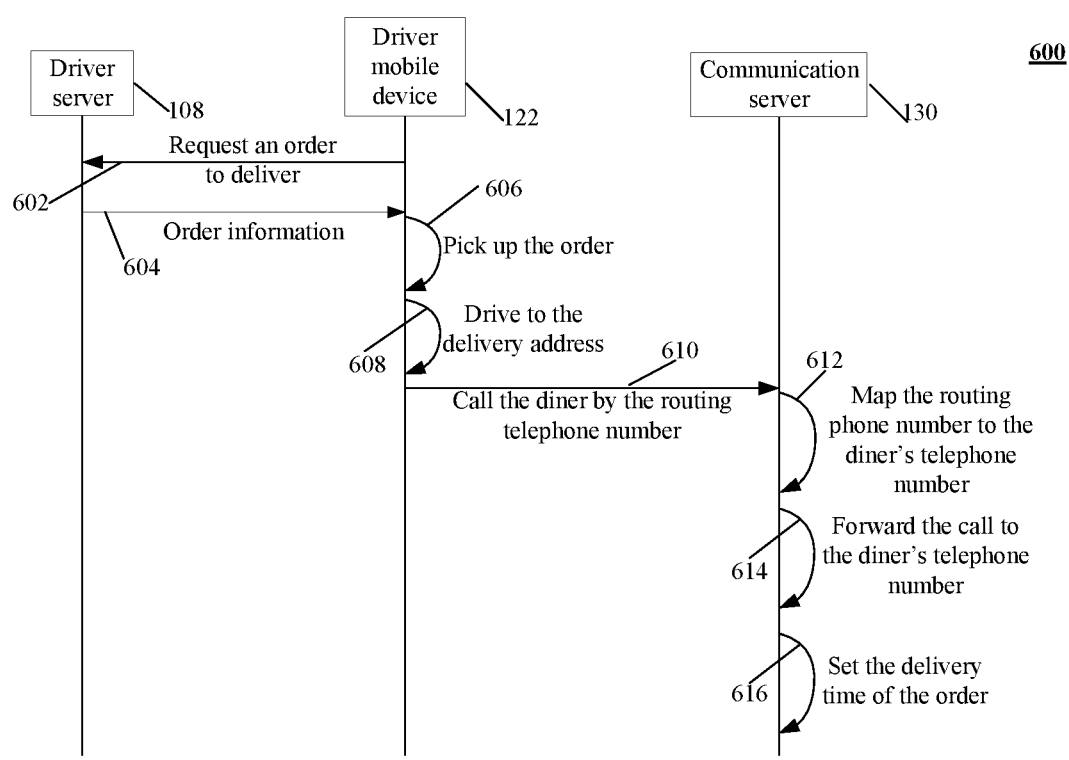
FIG. 6 is a sequence diagram depicting a process by which the time of delivery of an order is determined in accordance with the teachings of this disclosure.

Referring to FIG. 6, a process 600 by which the accurate time of delivery of the order is determined is shown. At 602, the deliveryman 118 uses his driver mobile device 122 to request an order to deliver. The driver server software application selects an order for the delivery driver 118. At 604, the order information of the selected order, such as the order number, serving restaurant, routing telephone number for the order, and the delivery address, is sent to the driver mobile device 122. In a different implementation, the driver 118 bids for orders to deliver; and the driver server software application awards him with one or more orders to deliver. In a further different implementation, the driver 118 simply stops by the restaurant 35 to look for orders to deliver.

After the deliveryman 118 receives the order information for delivery, at 606, he goes to the restaurant 35 to pick up the order. Usually, the deliveryman 118 can drive an automobile, ride a bicycle or walk to make deliveries. At 608, the deliveryman 118 drives to the delivery address of the order to make the delivery. When he arrives at the delivery address, at 610, he places a call at the routing telephone number of the order. The telephone call is received by the communication server 130. In one implementation, the communication server 130 is an IP PBX (meaning Internet Protocol Private Branch Exchange) that provides audio and instant messaging communication through the TCP/IP protocol stack. An IP PBX interconnects an internal network with Public Switched Telephone Networks ("PSTN") for telephony communication. In one embodiment, the IP PBX functions are implemented in a software application that runs on the communication server 130.

At 612, the communication server software application receives the call placed at 610. The telephone call indicates a calling number (i.e., the delivery driver's 118 telephone number) and a called number (i.e., the routing telephone number associated with the order). As used herein, the telephone call is referred to herein as an order delivery message. The source telephone number of the order delivery message is the calling number; the destination telephone number of the order delivery message is the called number; and the message type of the order delivery message is telephone call. In other words, the order delivery message indicates a source telephone number, a destination telephone number and a message type. Additionally, the telephone call (i.e., the order delivery message) further indicates a message reception time, i.e., the time when the telephone call is received.

Figure 7:
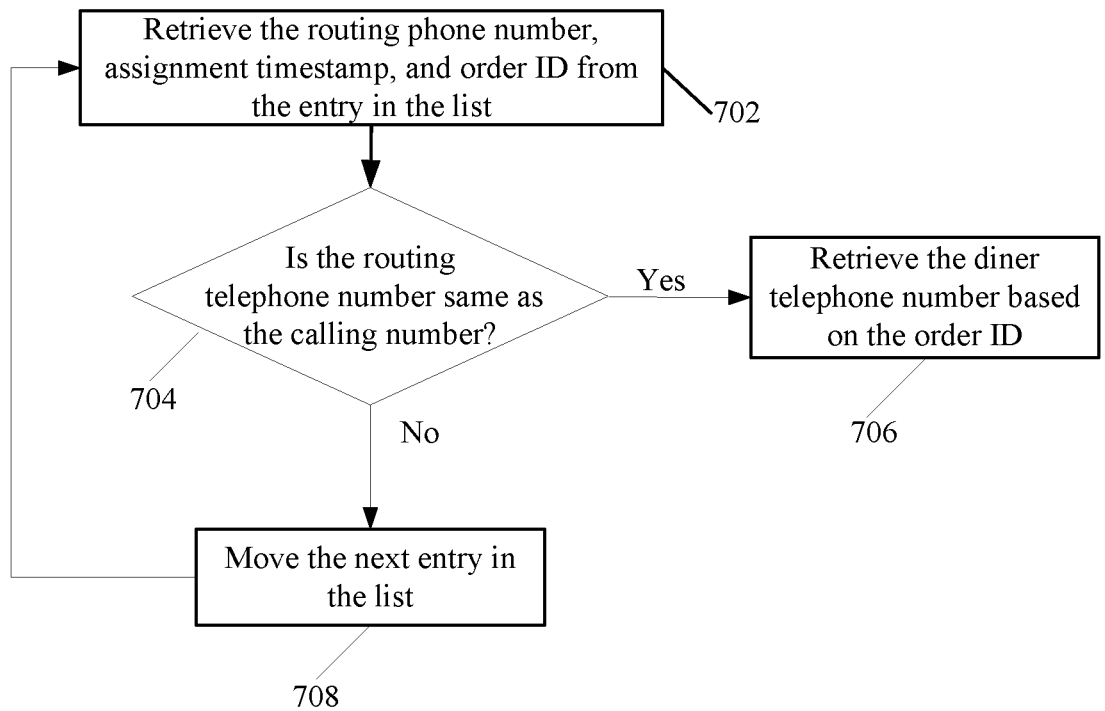
FIG. 7 is a flowchart that depicts a process by which a calling telephone number is mapped to a customer telephone number in accordance with the teachings of this disclosure.

Additionally, at 612, the communication server software application maps the calling number to the order by performing a mapping process 700 as illustrated in FIG. 7. Turning now to FIG. 7, at 702, the communication server software application retrieves the routing telephone number 402, assignment timestamp 404 and the order ID 406 from an entry in the list 400. In one implementation, the communication server software application starts from the first entry in the list 400. Alternatively, the communication server software application performs a quick search, such as a binary search based on the routing telephone number, on the list 400. A different quick search method is based on hashed keys generated from the, for example, the routing telephone numbers.

At 704, the communication server software application determines whether the routing telephone number 402, retrieved at 702, is same as or matches the calling number. If so, at 706, the communication server software application retrieves the diner telephone number 1008 of the diner 18. For example, the communication server software application accesses the database 104 to access the order record table 1000 to retrieve the diner telephone number based on the order ID retrieved at 702. Alternatively, the diner telephone number 1008 is an additional field for each entry in the list 400. For example, the alternate entry is illustrated at 460 in FIG. 4. The entry 460 includes a diner's telephone number field 452.

Turning back to 704, if the telephone numbers do not match, at 708, the communication server software application moves to the next entry in the list 400 to search for the matching routing telephone number. It should be noted that the communication server software application further checks whether the search should be ended to avoid an endless loop.

Turning back to FIG. 6, at 614, the communication server software application forwards the telephone call to the diner's telephone number, which is associated with and corresponds to the diner device 18 or a separate telephone device. The forwarded call is also referred to herein as an order delivery message. The source telephone number of the order delivery message is the deliveryman's telephone number; the destination telephone number of the order delivery message is the diner's 16 telephone number; and the message type of the order delivery message is telephone call. Accordingly, it can be said that, at 614, the communication server software application sends a new order delivery message to the diner 16. At 616, the communication server software application sets the delivery time of the order to the time of the telephone call. In other words, the calling time is the time mark 208. At 616, the time of delivery is further stored in the database 104 as indicated at 1054.

Figure 8:
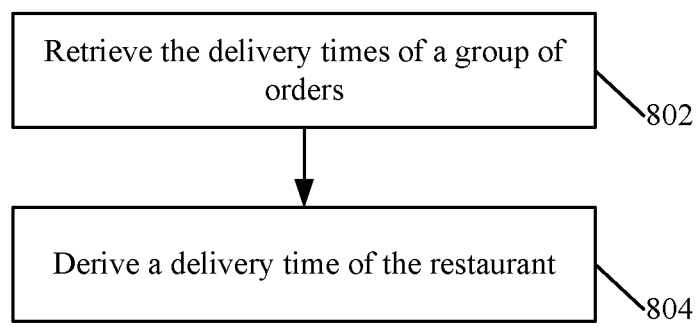
FIG. 8 is a flowchart that depicts a process by which a delivery time of a restaurant is determined in accordance with the teachings of this disclosure.

The delivery times of orders served by a particular restaurant (such as the restaurant 35) are used to determine the delivery time of the restaurant 35 as shown in FIG. 8. Turning to FIG. 8, a process for determining the delivery time of the restaurant 35 is generally indicated at 800. At 802, the restaurant server software application (or a different server software application) retrieves the delivery times of a group of orders served by the restaurant 35. The delivery time of a specific order is the time starting from the time mark 202 and ending at the time mark 208. In one implementation, the delivery time of the specific order is calculated as the difference between the order reception timestamp 1046 and the order delivered timestamp 1054 after they are retrieved from the database 104.

The orders served by the restaurant 35 can be grouped by various criteria, such as day of the week, meal of the day, hour of the day, last ten days, weather condition, distance from the particular restaurant, or all orders. At 804, the restaurant server software application derives a delivery time of the restaurant 35. For example, a statistical measure (such as mean, median, etc.) is derived from the delivery times of the group of orders. The statistical measure is then regarded as the delivery time of the restaurant 35 corresponding to the grouping criteria. Using the same process, the service time of the restaurant 35 can be determined.

Figure 9A:
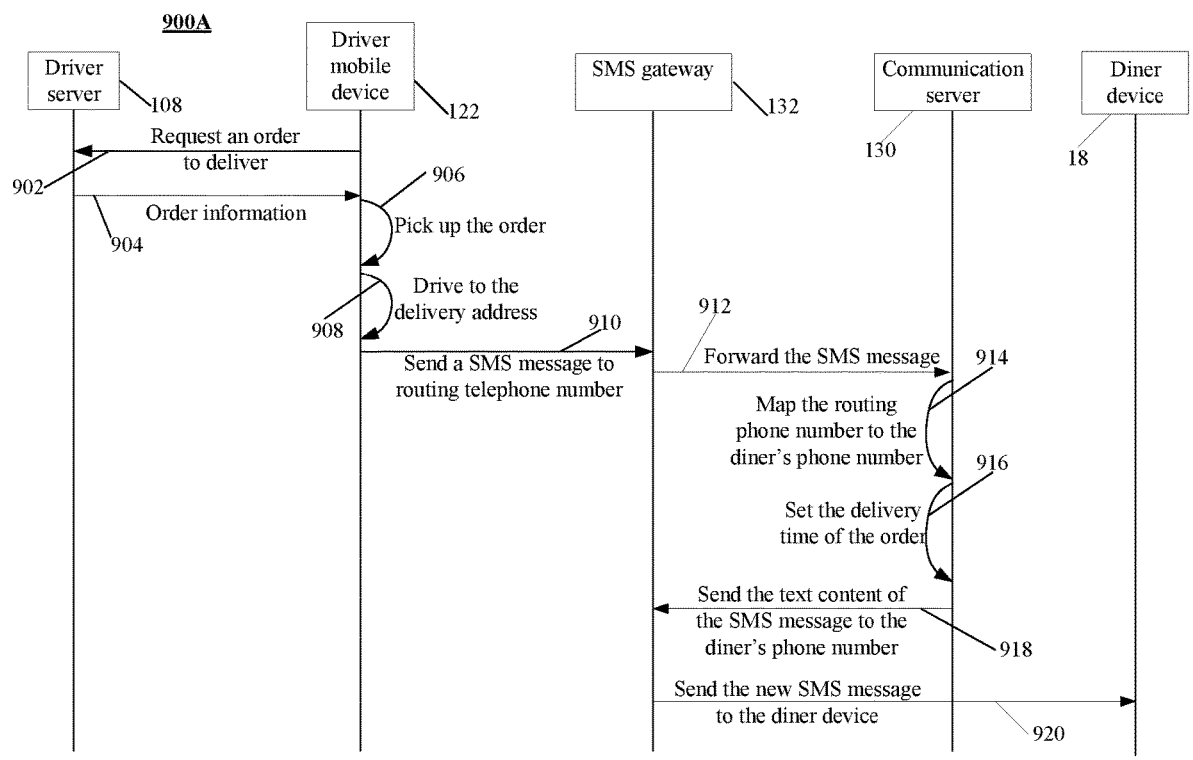
FIG. 9A is a sequence diagram depicting a process by which the time of delivery of an order is determined in accordance with the teachings of this disclosure.

In a different implementation, the delivery driver 118 sends a SMS message (or text message in general) to the diner 18 when he arrives at the delivery address for the diner 18. Referring to FIG. 9A, a process 900A by which the accurate time of delivery of the order is determined is shown. At 902, the deliveryman 118 uses his driver mobile device 122 to request an order for delivery. The driver server software application selects an order for the delivery driver 118. At 904, the order information of the selected order, such as the order number, serving restaurant, routing telephone number for the order, and the delivery address, is sent to the driver mobile device 122.

After the deliveryman 118 receives the order information for delivery, at 906, he goes to the restaurant 35 to pick up the order. At 908, the deliveryman 118 drives to the delivery address of the order to make the delivery. When he arrives at the delivery address, at 910, he sends a SMS message (or text message in general) to the routing telephone number of the order. The SMS message is first received by the SMS gateway 132. At 912, the SMS gateway 132 forwards the SMS message to the communication server 130. At 914, the communication server software application receives the SMS message. The SMS message is also referred to herein as an order delivery message. The source telephone number of the order delivery message is the deliveryman's telephone number; the destination telephone number of the order delivery message is the routing telephone number associated with the order; and the message type of the order delivery message is text messaging. The order delivery message (i.e., the SMS message) further indicates a message reception time, i.e., the time when the SMS message is received by the communication server 130. Additionally, the order delivery message includes text content in its body.

The communication server software application further maps the sending number to the order by performing a mapping process similar to the process 700. At 916, the communication server software application sets the delivery time of the order to the time of the reception of the SMS message. In other words, the SMS message reception time is the time mark 208. The time of delivery is further stored in the database 104 as indicated at 1054. At 916, the communication server software application further stores the delivery driver's 118 telephone number. For example, the delivery driver's 118 telephone number is stored in a deliveryman's telephone number field 464 in the corresponding routing telephone number entry 460.

At 918, the communication server software application sends the text content of the SMS message to the telephone number of the diner of the order. The new SMS message is also referred to herein as an order delivery message. The source telephone number of the order delivery message is the routing telephone number associated with the order; the destination telephone number of the order delivery message is the diner's 16 telephone number; and the message type of the order delivery message is text messaging.

Figure 9B:
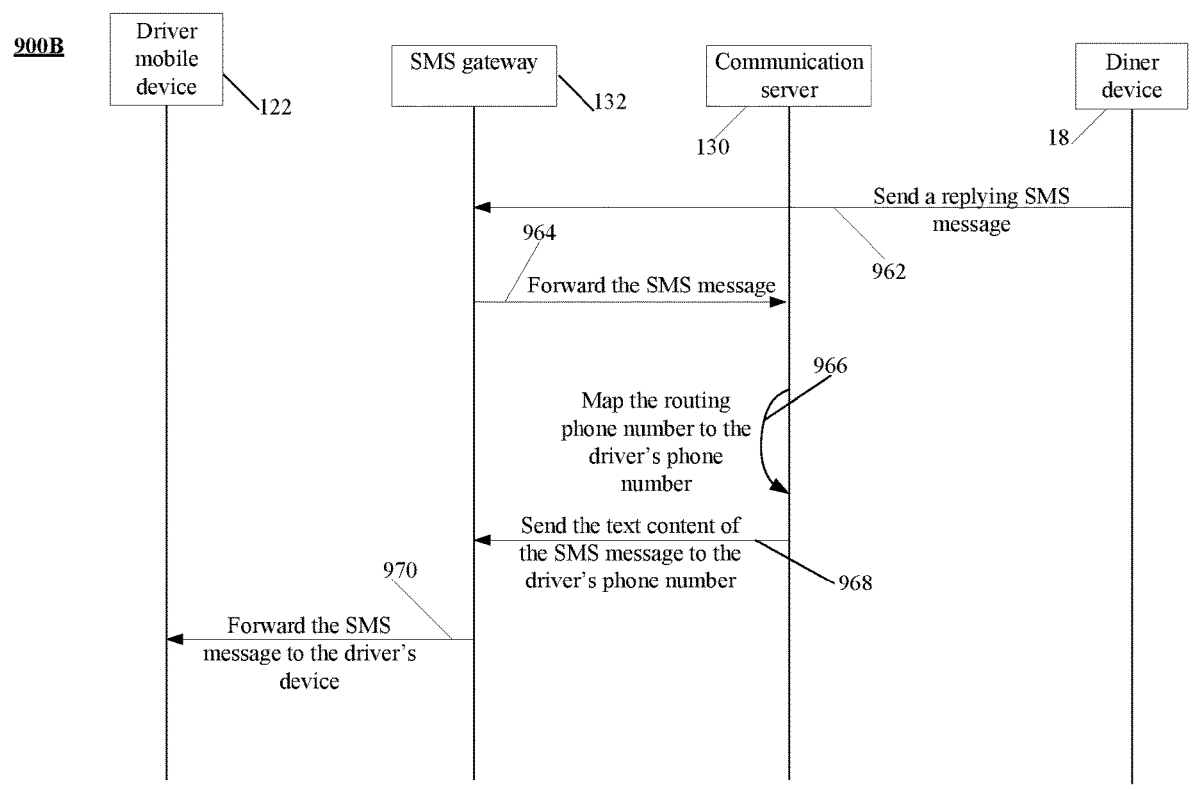
FIG. 9B is a sequence diagram depicting a process by which a SMS message is sent from a customer to a delivery driver in accordance with the teachings of this disclosure.

At 920, the SMS gateway sends the new SMS message to the diner device 18. The diner 16 may send a reply message to the driver 118. In such a case, a process 900B is performed by the system 100. The process 900B is further illustrated by reference to FIG. 9B. Turning to FIG. 9B, at 962, the diner device 18 sends a replying SMS message, composed by the diner 16, to the delivery driver 118. The replying SMS message is first received by the SMS gateway 132. The SMS gateway 132 then, at 964, sends the replying SMS message to the communication server 130. The replying SMS message is also referred to herein as an order delivery message. The source telephone number of the order delivery message is the diner's 16 telephone number 452; the destination telephone number of the order delivery message is the routing telephone number 402 associated with the order; and the message type of the order delivery message is text messaging.

At 966, the communication server software application performs a process similar to the process 700 to map the routing phone number, which is the target number of the replying SMS message, to the delivery driver's 118 telephone number 454. At 968, the communication server software application sends the text content of the replying SMS message to the driver's 118 telephone number 454. The new SMS message is first received by the SMS gateway 132. The SMS gateway 132 then, at 964, sends the replying SMS message to the communication server 130. The replying SMS message is also referred to herein as an order delivery message. The source telephone number of the order delivery message is the routing telephone number 402 associated with the order; the destination telephone number of the order delivery message is the deliveryman's 118 telephone number 454; and the message type of the order delivery message is text messaging. The SMS gateway 132 then, at 970, sends the new SMS message to the driver mobile device 122.

In an alternate embodiment, the on-site service appliance 36 is a fax machine. In such a case, through the communication server 130, the restaurant server 34 sends the order to the restaurant 35 by transmitting a facsimile with the contents of the order. The facsimile contains the routing phone number associated with the order. The on-site service appliance 36 then prints a copy of the order for a restaurant employee to review. After reviewing the order, the restaurant employee uses a telephone (not shown) to confirm that the order was successfully received. In one implementation, the service system 100 uses an automatic service that calls the restaurant 35, at which time the restaurant employee can enter a code printed on the order to confirm successful reception of the order.

Obviously, many additional modifications and variations of the present disclosure are possible in light of the above teachings. Thus, it is to be understood that, within the scope of the appended claims, the disclosure may be practiced otherwise than is specifically described above. For example, the communication server software application maintains the list 400 in memory for fast accessing. As an additional example, the communication server software application does not directly access the database 104. Instead, the communication server software application receives the list 400 and updates to the list 400 from, for example, the restaurant server software application. As still further an example, the service system 100 is practiced to determine the time of delivery of a non-food order, such as an order for grocery, clothing, office supplies, etc.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer-implemented server-based method of rerouting a delivery message, the method comprising:
   receiving, by a first server, an order associated with a customer device over a wide area network, wherein the order specifies a customer telephone number of a customer;
   using, by the first server, a finite number of reusable routing telephone numbers maintained by the first server for routing information relating to the order, comprising:
      selecting a routing telephone number from the finite number of reusable routing telephone numbers maintained by the first server, by using a pointer to point to a next available routing telephone number entry;
      forming an association between the routing telephone number and the order, based on the next available routing telephone number entry that the pointer points to;
   receiving, by a second server, an order delivery message associated with a delivery mobile device that is remote from the first server and the second server, wherein the order delivery message indicates a source telephone number and a destination telephone number, wherein the source telephone number corresponds to the delivery mobile device and the destination telephone number is the routing telephone number for the order;
   in response to receiving the order delivery message, mapping, by the second server, the routing telephone number to the customer telephone number based on the association between the routing telephone number and the order;
   forwarding, by the second server, the order delivery message to the customer device on behalf of the delivery mobile device to safeguard a privacy of the customer, wherein the order delivery message indicates the customer telephone number as the destination telephone number based on the mapping;
   setting, by the second server, a message reception time of the order delivery message as a delivery time of the order.

2. The method of claim 1, wherein receiving the order associated with the customer device comprises retrieving, by the first server, the order from a database in response to an electronic notification regarding a new electronically placed order.

3. The method of claim 1, wherein receiving the order associated with the customer device comprises querying a database for a new electronically placed order.

4. The method of claim 1, wherein the association between the routing telephone number and the order is valid for a predetermined amount of time.

5. The method of claim 1, wherein the order delivery message is a telephone call.

6. The method of claim 1, wherein the order delivery message is a text message.

7. The method of claim 1, wherein receiving the order delivery message comprises receiving the order delivery message from a SMS gateway.

8. The method of claim 7, wherein forwarding the order delivery message comprises forwarding the order delivery message via the SMS gateway.

9. The method of claim 1, further comprising:
   maintaining, by the first server, the finite number of reusable routing telephone numbers as entries in a database;
   in response to the association, updating, by the first server, the finite number of reusable routing telephone numbers;
   sending, by the first server, the order and the routing telephone number to an on-site service appliance at a restaurant.

10. The method of claim 1, further comprising storing, by the second server, the delivery time of the order into a database.

11. A system for rerouting a delivery message, the system comprising:
   a first server including a first processor, a first network interface coupled to the first processor and adaptively coupled to a database, and a first server software application operating on the first processor, wherein the first server software application is adapted to:
      receive an order associated with a customer device over a wide area network, wherein the order specifies a customer telephone number of a customer;
      use a finite number of reusable routing telephone numbers maintained by the first server for routing information relating to the order, wherein using comprises:
         selecting a routing telephone number from the finite number of reusable routing telephone numbers maintained by the first server, by using a pointer to point to a next available routing telephone number entry;
         forming an association between the routing telephone number and the order, based on the next available routing telephone number entry that the pointer points to;
   a second server including a second processor, a second network interface coupled to the second processor, and a second server software application operating on the second processor, wherein the second server software application is adapted to:
      receive an order delivery message associated with a delivery mobile device that is remote from the first server and the second server, wherein the order delivery message indicates a source telephone number and a destination telephone number, wherein the source telephone number corresponds to the delivery mobile device and the destination telephone number is the routing telephone number for the order;
      in response to receiving the order delivery message, map the routing telephone number to the customer telephone number based on the association between the routing telephone number and the order;
      forward the order delivery message to the customer device on behalf of the delivery mobile device to safeguard a privacy of the customer, wherein the order delivery message indicates the customer telephone number as the destination telephone number based on the mapping;
      setting a message reception time of the order deliver message as a delivery time of the order.

12. The system of claim 11, wherein receiving the order associated with the customer device comprises retrieving, by the first server, the order from a database in response to an electronic notification regarding a new electronically placed order.

13. The system of claim 11, wherein receiving the order associated with the customer device comprises querying a database for a new electronically placed order.

14. The system of claim 11, wherein the association between the routing telephone number and the order is valid for a predetermined amount of time.

15. The system of claim 11, wherein the order delivery message is a telephone call.

16. The system of claim 11, wherein the order delivery message is a text message.

17. The system of claim 11, wherein receiving the order delivery message comprises receiving the order delivery message from a SMS gateway.

18. The system of claim 17, wherein forwarding the order delivery message comprises forwarding the order delivery message via the SMS gateway.

19. The system of claim 11, wherein the first server software application is further adapted to:
- maintain the finite number of reusable routing telephone numbers as entries in a database;
- in response to the association, update the finite number of reusable routing telephone numbers;
- send the order and the routing telephone number to an on-site service appliance at a restaurant.

20. The system of claim 11, wherein the second server software application is further adapted to store the delivery time of the order into a database.

\* \* \* \* \*